June 10, 1947.  M. P. WINTHER  2,421,860
SQUIRREL-CAGE ROTOR FOR INDUCTION MACHINES
Filed May 2, 1945  2 Sheets-Sheet 1
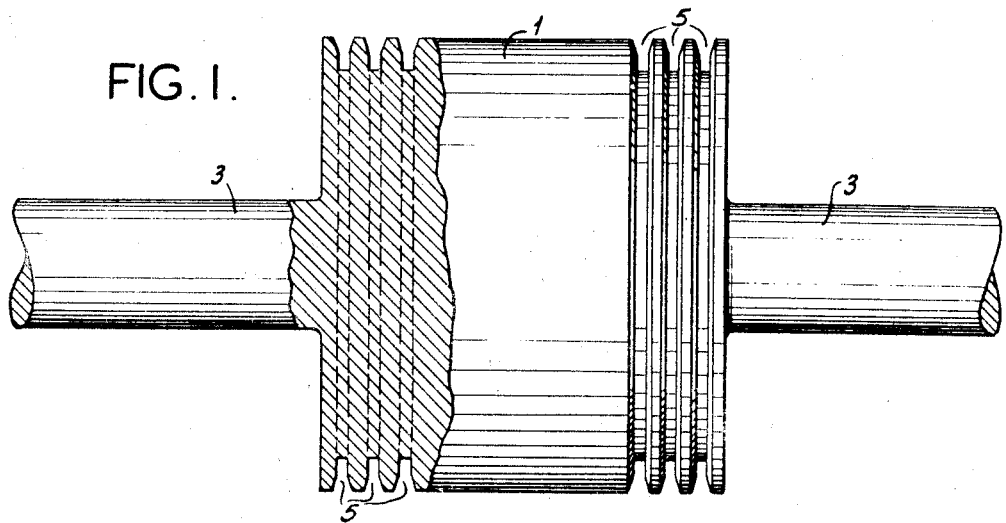
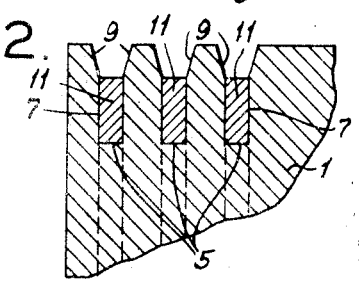
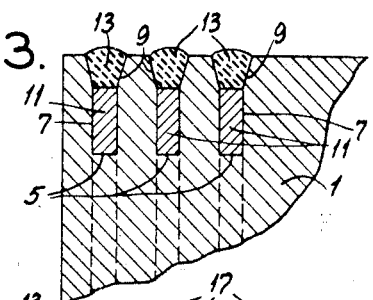
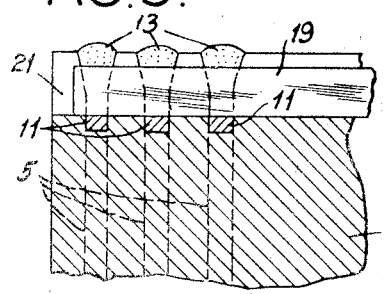
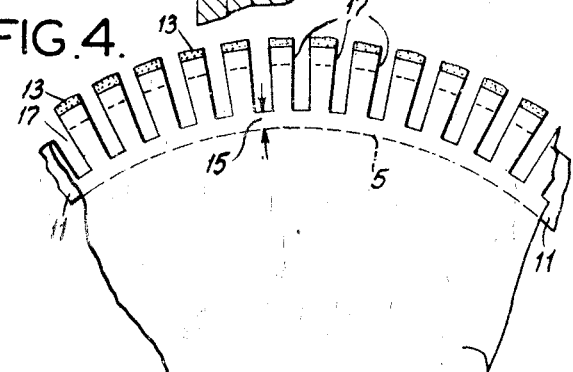
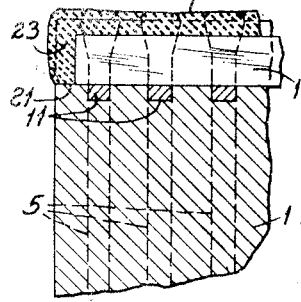
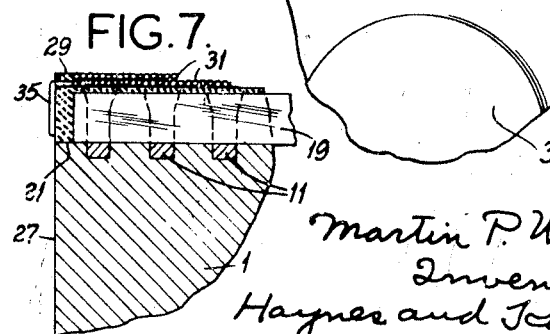
Martin P. Winther,
Inventor.
Haynes and Koenig,
Attorneys.

June 10, 1947. M. P. WINTHER 2,421,860
SQUIRREL-CAGE ROTOR FOR INDUCTION MACHINES
Filed May 2, 1945 2 Sheets-Sheet 2

Martin P. Winther,
Inventor.
Haynes and Koenig,
Attorneys.

Patented June 10, 1947

2,421,860

UNITED STATES PATENT OFFICE 2,421,860

SQUIRREL-CAGE ROTOR FOR INDUCTION MACHINES

Martin P. Winther, Waukegan, Ill., assignor to Martin P. Winther, as trustee

Application May 2, 1945, Serial No. 591,544

18 Claims. (Cl. 172—120)

1

This invention relates to rotors, and with regard to certain more specific features, to a squirrel-cage rotor for electrical induction machines such as induction motors particularly.

Among the several objects of the invention may be noted the provision of a high-speed, squirrel-cage rotor for induction motors and the like; the provision of a stronger rotor of the class described which operates at lower temperatures and in which critical conditions of vibration come at much higher speeds; the provision of a rotor of the class described in which is greatly reduced the tendency of the conducting bars and rings to separate from the main body or slug of the rotor; and the provision of a method of making a rotor of this class whereby it may be made at a reasonable cost. Other objects will be in part obvious and in part pointed out hereinafter.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

In the accompanying drawings, in which one of various possible embodiments of the invention is illustrated, Fig. 1 is a side elevation, parts being broken away showing the new rotor and illustrating a first operation;

Fig. 2 is an enlarged detail section illustrating a second operation;

Fig. 3 is an enlarged detail section illustrating a third operation;

Fig. 4 is a fragmentary end view illustrating a fourth operation;

Fig. 5 is a view similar to Figs. 2 and 3 but illustrating a fifth operation;

Fig. 6 is a view similar to Fig. 5 but illustrating a sixth operation;

Fig. 7 is a view similar to Fig. 6 illustrating eighth and ninth operations, a seventh intervening operation requiring no illustration;

Similar reference characters indicate corresponding parts throughout the several views of the drawings.

Some electrical machines could be advantageously operated at high speeds if it were not for rotor weaknesses. For example, eddy-current dynamometer rotors, rotors of induction motors

2 operating at high frequency such as for example 450 cycles per second. Speeds that could be advantageously employed are for example 20,000 to 30,000 R. P. M. and even higher.

In the case of a dynamometer rotor copper bars or windings are not ordinarily used. However, part of the invention is useful on such rotors. In the case of squirrel-cage induction motors and the like, copper conductors are used. One of the primary problems as to these is to prevent them from loosening under the centrifugal forces involved at high speeds. All features of the invention are useful in such induction motor applications.

Referring now more particularly to Fig. 1, there is shown at numeral 1 the body of a drum formed integrally with gudgeons 3, the latter being supported in the motor bearings. Members 1 and 3 are preferably forged as a single slug of homogeneous, low carbon, soft steel which is completed by machining. This one-piece integral slug construction provides a rotor which may be rotated up to two times or so the speed of one in which the rotor has been drilled or otherwise provided with a hole for a shaft. A rotor which is two times as strong against bursting as another can be made to rotate safely at about 1.4 times the latter. Thus the speed limit is raised considerably by forming the rotor with its gudgeons from a single slug.

Figure 11:
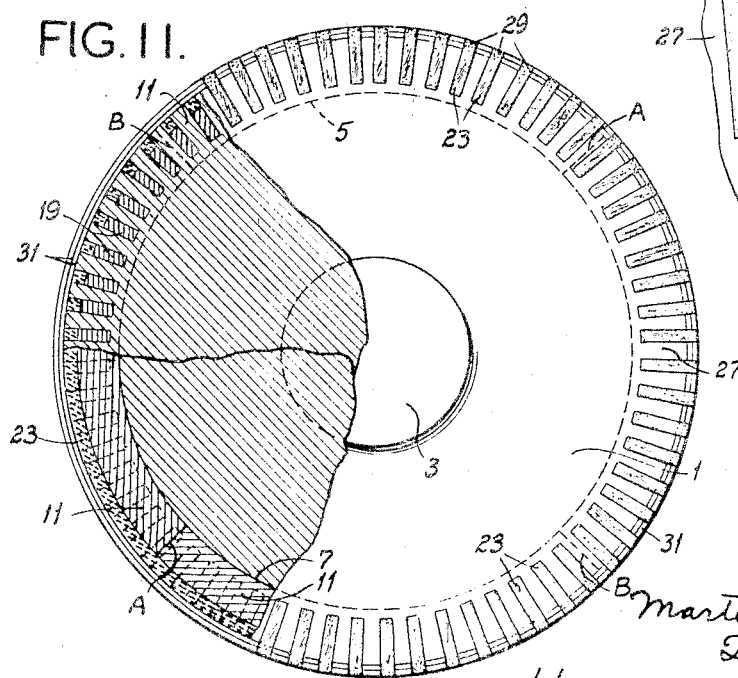

In cases where the rotor is to be used as an induction motor rotor, the drum 1 is first machined at opposite ends with plurality of peripheral grooves 5. Each groove 5 has a rectangular base section 7 and a tapered outer portion 9. Before proceeding the grooves are cleaned. Into the rectangular base portion 7 are inserted snugly fitting clean copper conductors 11 of semicircular shapes. The opposite joints between the members of one pair of semi-circular conductors 11 in one groove are placed at 90° with respect to those in an adjacent groove. This is indicated at A and B in Fig. 11. The conductors completely fill the groove base sections 7.

Next, as indicated in Fig. 3, the semi-circular conductor rings 11 are held in place by peripheral welding 13 which is built up into the tapered portions 9 of the grooves 5. This welding holds in the conductors 7 and with the grooves forms a matrix form for the conductors. The significance of the term "matrix" will appear below.

Next, as indicated in Fig. 4, the rotor 1 is slotted axially as shown at 17, the slots 17 traversing the welding 13. They intersect the conductors 7 but do not cut entirely through them, as indicated by the dimension 15 marked on Fig. 4. Thus the conductors 7 are only notched and not completely segmented.

The next step, as illustrated in Fig. 5, is to insert snugly fitting clean copper bars 19 in the longitudinal slots 17. The bars 19 are shorter than the length of the rotor 1, leaving equal spaces 21 at the ends. They are also radially shallower than the grooves 17.

Next, the portions of the slots 17 not occupied by the copper bars 19, that is, outside of said bars 19 and beyond their ends, are welded as illustrated in Fig. 6. This welding is shown at numeral 23. The welded slots 17 form a matrix mold for the bars 19.

After the stated welding operations, the entire rotor is heated to about 2025° F. for fifteen minutes in a reducing-atmosphere furnace. This is sufficiently high to braze all of the copper bars in all of the matrices underneath the welding. In this manner the copper becomes fused, and integrally formed as a one-piece squirrel cage and joined with the steel of the drum 1 to form a very strong amalgamation. It will be understood that the surfaces of the copper and the grooves need properly to be cleaned before insertion of the copper and that suitable brazing flux may be used if required. The stated temperature is not enough to melt either the steel of the rotor or the steel of the welding but enough to braze the copper. The copper contained within the solid steel matrix cannot escape. Since the ends of the semi-circular copper rings 7 become brazed together to form substantially solid rings and the bars 19 become brazed to the rings 7, there results after cooling a one-piece squirrel-cage conductor embedded in and amalgamated by brazing to the steel rotor.

Broadly considered, the welded rotor provides a matrix cavity, the walls of which are composed of the rotor material, the same being filled with the conductor material, which is brazed to the walls of the matrix cavity by heat.

Next the rotor is exteriorly machined as desired. It may be machined so as to present a smooth cylindric exterior. The ends 27 may be machined flat. But the copper rings and bars should preferably be left covered with steel. If a very strong rotor is desired, then the outside of the rotor is machined to accommodate a steel reinforcing banding wire 31, such as illustrated in Figs. 7–10. This banding wire is not necessary in all cases.

Figure 10:
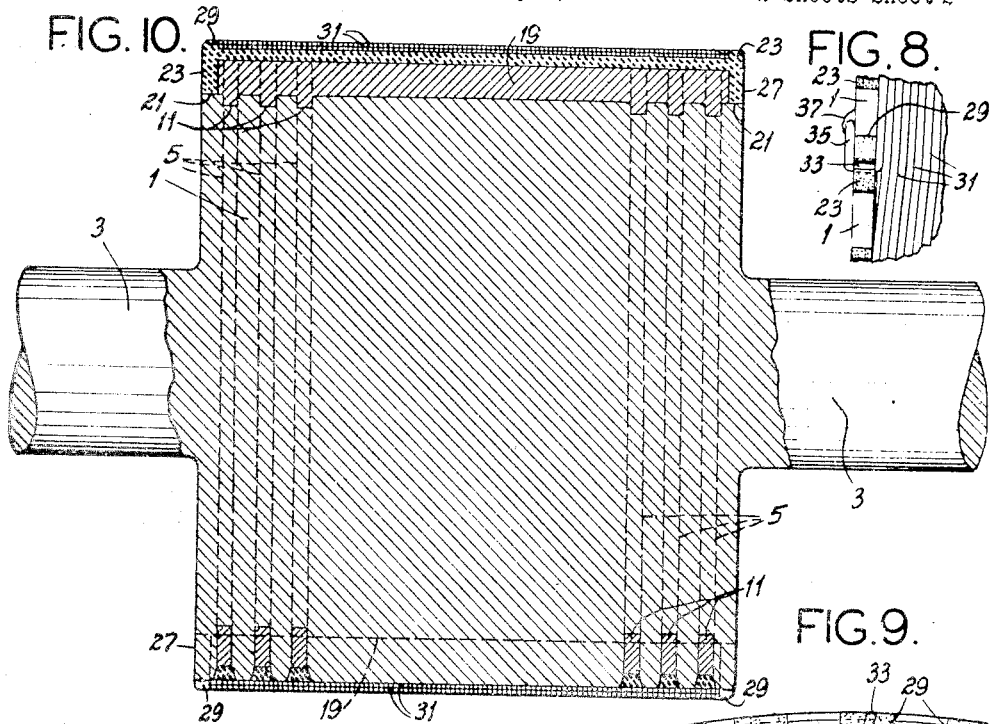
Fig. 10 is a view similar to Fig. 1 but on a larger scale, showing the finished rotor; and, Fig. 11 is a left-end view of Fig. 10 showing said finished rotor.
Figure 8:
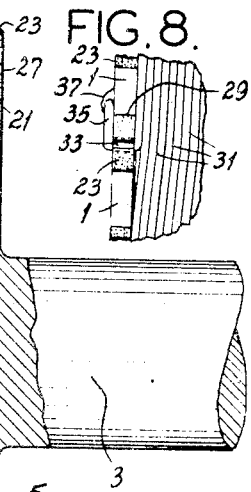
Fig. 8 is a fragmentary detail plan view of a small section of the rotor and showing an anchor for a banding wire.
Figure 9:
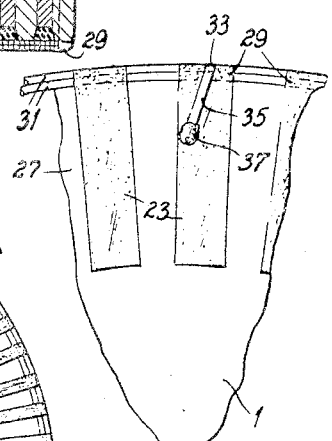
Fig. 9 is a left-end view of Fig. 8.

The banding wire is wrapped under tension in one or more layers. Its ends are anchored, as illustrated in Figs. 8 and 9, by means of saw-cuts 33 in the flanges 29. A wire end is inserted into a saw-cut and then the cut is peened over the wire. The extending end 35 of the wire is then welded to the end of the rotor as indicated at 37. Both ends of the wire are anchored in like manner. The banding wire is for example .045" tinned piano wire with a tensile strength of not less than 400 lbs. per wire wrapped with a tension of not less than 300 lbs. per wire.

While the grooves 17 are shown as being parallel to the axis of the rotor, it will be understood that they may be angled thereto to provide for an angular position of the inserted conductors. Such an angle is often desired in squirrel-cage rotors. The term axial, describing the position of said grooves 17 is intended to cover such cases.

An important advantage of the invention is the fact that the copper of the squirrel-cage is heat bonded to the steel. This is advantageous over constructions in which copper is cast into undercut dovetail slots since in the latter case there is only a mechanical interlock due to the dovetails and no surface bond between the cast copper and the steel.

Another important advantage is that the welding which encloses all of the copper within the slots not only provides a solid matrix for containing the copper while it is being brazed or bonded, but also provides a solid steel exterior on the rotor. This avoids the generation of heat by eddy currents induced by slot frequency. In some former rotors the exterior slots cause pulsations which produce considerable heat due to the high frequency encountered. Since the present rotor has no outside slots, that is, is magnetically continuous, this source of heating is eliminated. The term brazing as used herein is intended as an example only of other forms of bonded attachment between the copper bars and the rotor. For example, silver soldering might be used.

In view of the above it will be seen that a squirrel-cage type of rotor is provided in which the conductors are thoroughly anchored against outward movement under centrifugal forces at high speed. In addition, the process of inserting the conductors 19 and short-circuiting rings 7 is accomplished by means of very simple operations.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A rotor for electrical machines comprising a homogeneous soft-steel drum, peripheral grooves in the drum in which are brazed copper rings, said grooves exteriorly of the copper rings being closed by welding, axial grooves in said drums partially intersecting said copper rings, axial copper bars in said axial grooves and brazed to the drum and said copper rings, and welding closing said axial grooves outside of the axial bars.

2. A rotor for electrical machines comprising a homogeneous soft-steel drum, peripheral grooves in the drum in which are brazed copper rings, said grooves exteriorly of the copper rings being closed by welding, axial grooves in said drums partially intersecting said copper rings, axial copper bars in said axial grooves and brazed to the drum and said copper rings, welding closing said axial grooves outside of the axial bars, and banding means wrapped under tension on the outside of said drum.

3. A rotor for electrical machines comprising a drum, relatively deep peripheral grooves located near the ends of the drum, continuous conducting rings located in the grooves, the radial depth of the rings being less than the depth of the grooves, said grooves being welded shut peripherally outside of the rings.

4. A rotor for electrical machines comprising a drum, relatively deep grooves located near the ends of the drum, continuous conducting rings located in the grooves, the radial depth of the rings being less than the depth of the grooves, said grooves being welded shut peripherally outside of the rings, axial grooves in the surface of the drum of less depth than said peripheral grooves, axial conducting bars in said axial grooves, said bars being of less depth and less length than said axial grooves, and welding closing said axial bars in said axial grooves.

5. The method of producing a solid squirrel-cage rotor drum comprising machining at least one peripheral groove of substantial depth in the drum, inserting peripherally engaging conducting segments in the groove, the radial depth of said segments being less than the depth of the groove, welding shut the part of the groove unfilled by the conducting segments, machining axial grooves in the surface of the drum and through said ring segments, the depth of the axial grooves being less than the depth of the peripheral grooves so that said segments are not further divided, inserting conducting bars in said axial grooves, said bars being shallower and shorter than the axial grooves, filling the unoccupied spaces within the grooves by welding, heating the assembly thus formed to a temperature for brazing the conducting rings and bars but lower than the softening point of said drum and the welding material therefor, the drum being composed of material different from that of the bars and segments, whereby the conducting rings and bars within their grooves are brazed together and to the rotor.

6. The method of producing a solid squirrel-cage rotor drum comprising machining at least one peripheral groove of substantial depth in the drum, inserting peripherally engaging conducting segments in the groove, the radial depth of said segments being less than the depth of the groove, welding shut the part of the groove unfilled by the conducting segments, machining at least one axial groove in the surface of the drum and through said ring segments, the depth of the axial groove being less than the depth of the peripheral groove so that said segments are not further divided, inserting a copper bar in said axial groove, said bar being shallower and shorter than the axial groove, filling the unoccupied spaces within the grooves by welding, heating the asembly thus formed to a brazing temperature of the conducting ring segments and bar but lower than the softening point of said drum and the welding material therefor, whereby the conducting segments and bar within their grooves are brazed together and to the rotor.

7. The method of producing a solid squirrel-cage rotor drum comprising machining peripheral grooves of substantial depth in the drum, inserting peripherally engaging conducting segments in the grooves, the radial depth of said segments being less than the depth of the grooves, welding shut the parts of the grooves unfilled by the conducting segments, machining axial grooves in the surface of the drum and through said ring segments, the depth of the axial grooves being less than the depth of the peripheral grooves so that said segments are not further divided, inserting copper bars in said axial grooves, said bars being shallower and shorter than the axial grooves, filling the unoccupied spaces within the grooves by welding, heating the assembly thus formed to a brazing temperature of the conducting rings and bars but lower than the softening point of said drum and the welding material therefor, whereby the conducting rings and bars within their grooves are brazed together and to the rotor, and cylindrically machining the exterior of the assembly thus formed.

8. The method of producing a solid squirrel-cage rotor drum comprising machining peripheral grooves of substantial depth in the drum, inserting peripherally engaging conducting segments in the grooves, the radial depth of said segments being less than the depth of the grooves, welding shut the parts of the grooves unfilled by the conducting segments, machining axial grooves in the surface of the drum and through said ring segments, the depth of the axial grooves being less than the depth of the peripheral grooves so that said segments are not further divided, inserting copper bars in said axial grooves, said bars being shallower and shorter than the axial grooves, filling the unoccupied spaces within the grooves by welding, heating the assembly thus formed to a brazing temperature of the conducting rings and bars but lower than the softening point of said drum and the welding material therefor, whereby the conducting rings and bars within their grooves are brazed together and to the rotor, cylindrically machining the exterior of the assembly thus formed, and thereafter wrapping a banding member on the cylindrically machined surface and anchoring it to the drum.

9. A squirrel-cage rotor comprising a homogeneous steel drum, relatively deep peripheral grooves at the ends of said drum, closely fitting conducting copper segments of less radial depth than the grooves and filling the bottoms of said grooves throughout their entire periphery, axial grooves in the drum crossing said peripheral grooves and passing through said segments, said axial grooves being of less depth than the peripheral grooves, closely fitting squirrel-cage copper bars in the axial grooves and being of less radial depth than said axial grooves, all of the copper members being brazed to the drum and to each other, and welding in-filling all groove spaces not occupied by the copper members.

10. A squirrel-cage rotor comprising a homogeneous steel drum, peripheral grooves at the ends of said drum, conducting copper segments of less radial depth than the grooves and filling the bottoms of said grooves throughout their entire peripheries, axial grooves in the drum crossing said peripheral grooves and passing through said segments, squirrel-cage copper bars in the axial grooves, all of the copper members being brazed to the drum and to each other, welding in-filling all groove spaces not occupied by the copper members on the outsides of the grooves, and integral coaxial steel gudgeons extending from said drum.

11. The method of inserting a conductor in a rotor of an electrical machine comprising cutting a matrix-forming recess under the surface of the rotor, snugly fitting a conductor into said recess of less depth than the recess, welding shut the exterior part of the recess unoccupied by the conductor to complete a matrix and then subjecting the rotor to a temperature adapted to braze the conductor to the matrix-forming portions of the rotor without softening the latter.

12. The method of inserting a copper conductor in a steel rotor of an electrical machine comprising cutting a recess larger than the conductor into the surface of the rotor, snugly fitting the copper conductor into said recess, the conductor being of less depth than the recess, welding shut the exterior part of the recess unoccupied by the conductor to form a matrix and then subjecting the rotor to a temperature of the order of 2025° F. to braze the conductor to the rotor.

13. A rotor for electrical machines comprising a drum in which is a matrix cavity completely filled by a conducting material other than that of the drum, the conductive material being heat-

[... illegible left column text ...] walls of the matrix cavity [...] filling the same.

[...] method of constructing a rotor for electrical machines comprising cutting a surface groove in the rotor, inserting a copper conductor in the groove to substantially fill the groove with the exception of an exterior part, filling said exterior part of the groove by welding in material similar to that of the rotor so as to form a complete enclosing matrix for the copper conductor, and heating the drum to a temperature adapted to cause brazing of the copper conductor to substantially all of the matrix-forming walls and subsequently machining the drum to form a smooth surface through the welding material outside of the copper conductor.

[...] The method of inserting a plurality of conductor bars into a rotor for electrical machines [...] machining one groove into the surface of the rotor, inserting a copper conductor [...] which is of less depth than the [...] closing the groove to form an enclosing matrix for the copper conductor, cutting [...] at an angle to the first groove in the surface of the rotor of depth less than that of the first groove and removing some of the said copper conductor and said welding, inserting a second copper conductor into the second groove crosswise of the first copper conductor, said second conductor being of less depth than the second groove, closing the second groove by welding to form a matrix enclosing the second conductor, and subjecting the resulting assembly to a temperature adapted to cause brazing of both conductors and subsequently machining the surface of the rotor to remove excess matrix-forming welding material.

16. A squirrel-cage rotor comprising a homogeneous steel rotor body having a substantially continuous cylindric exterior ferrous surface, integrally organized copper conductors embedded in the rotor below its surface and forming end rings and substantially axial bars, the copper conductors being bonded to the body.

17. A rotor for electrical machines comprising a one-piece substantially homogeneous steel body having a substantially continuous cylindric exterior ferrous surface, copper conductors embedded in the rotor below its surface and forming end rings and substantially axial bars, said copper conductors being bonded to one another.

18. A rotor for electrical machines comprising a one-piece substantially homogeneous steel body having a substantially continuous cylindric exterior ferrous surface, copper conductors embedded in the rotor below its surface and forming end rings and substantially axial bars, said copper conductors being bonded to one another and to the rotor.

MARTIN P. WINTHER.

REFERENCES CITED

The following references are of record in the file of this patent:

UNITED STATES PATENTS

| Number | Name | Date |
|---|---|---|
| 1,035,373 | McCollum | Aug. 13, 1912 |
| 2,372,590 | Ljunggren et al. | Mar. 27, 1945 |